United States Patent [19]

Shipp, Jr.

[11] Patent Number: 4,818,585
[45] Date of Patent: Apr. 4, 1989

[54] AGRICULTURAL PROTECTIVE FABRIC

[75] Inventor: Peter W. Shipp, Jr., Woodstock, Ga.

[73] Assignee: Kimberly-Clark Corporation, Neenah, Wis.

[21] Appl. No.: 88,757

[22] Filed: Aug. 24, 1987

[51] Int. Cl.$^4$ .............................................. B32B 27/14
[52] U.S. Cl. ......................................... 428/198; 47/9; 428/212; 428/286; 428/287; 428/288; 428/296; 428/913
[58] Field of Search ............... 428/198, 212, 286, 287, 428/288, 296, 913; 47/9

[56] References Cited

U.S. PATENT DOCUMENTS 4,374,888  2/1983  Bornslaeger .................... 428/198
4,686,790  8/1987  Lahalih et al. .................... 47/9

OTHER PUBLICATIONS

P. W. Shippard, P. C. Kohm; Nonwoven Fabrics in Agriculture; Jun. 16–19, 1986, Proceedings Nineteenth National Agricultural Plastics Congress.
Kimberly-Clark Corporation; Kimberly Farms Floating Row Cores, Dec. 1986.
Dow Chemical Company; Linktuf Agricultural Film, Oct. 1984.
Ken Bar brochure, Slitted Row Covers.
AMOCO; Seed Shield, Nonwovens Industry, 1986.

Primary Examiner—Marion C. McCamish
Attorney, Agent, or Firm—William D. Herrick

[57] ABSTRACT

There is disclosed an agricultural protective fabric having characteristics which dynamically change during the growing season as a result of the degradation of one of the fabric layers. The fabric is a two layer fabric of a nondegradable spun-bonded layer and a degradable melt-blown layer. During the early part of the season the melt-blown layer provides additional protection from frost. In one embodiment, as a result of ultraviolet light, the melt-blown layer degrades to provide less insulation and greater permeability.

9 Claims, 2 Drawing Sheets

AGRICULTURAL PROTECTIVE FABRIC

BACKGROUND OF THE INVENTION

This invention relates generally to agricultural protective fabrics, and more particularly concerns a multilayer protective fabric the characteristics of which dynamically change during the course of a growing season as the result of degradation of one of the fabric layers.

Nonwoven agricultural protective fabrics are used by growers to cover and protect crops, such as vegetables, turf, juvenile citrus trees, ornamental crops, and the like, from the environmental effects of frost, insects, and desiccation. Such protective fabrics not only protect the crops but also produce a greenhouse environment to stimulate and accelerate the growth of many crops. Such nonwoven agricultural protective fabrics must be lightweight, air and water permeable, insulative, able to pass light, and strong enough to avoid tearing as a result of handling and wind.

A number of manufacturers make protective agricultural fabric, including Kimberly-Clark Corporation, the assignee of the present invention. Kimberly-Clark Corporation manufactures and sells a spun-bonded polypropylene fabric having a basis weight of 0.6 ounce per square yard ($oz/yd^2$) under the trademark Kimberly Farms. Other agricultural protective fabrics include Linktuf agricultural film manufactured by Dow Chemical Company, Midland, Mich. Linktuf film is a rib reinforced low density polyethylene plastic. Another agriculture protective cover is spun-bonded polyester manufactured by The Inter Tech Group, North Charleston, S.C., and sold under the trademark Reemay. Amoco Fabrics and Fiber Co., Richmond, Va., sells a nonwoven polypropylene fabric under the mark Seed Shield. A spun-bonded polypropylene is manufactured by Sodoca SA of France and sold in the United States by International Paper under the trademark Agryl. Beghin-Say SA of France manufactures a polypropylene polyamide extruded film which is sold in the United States under the trademark Agronet by CDK, International.

The nonwoven protective fabrics of the prior art can be engineered to balance the grower's requirement for frost protection, light transmission, air and water permeability, desiccation prevention, and strength in order to meet the particular needs of particular growers. The needs of the grower, however, may change during the course of a single growing season. Obviously, during the early spring when the possibility of frost exists, it is advantageous to have a protective fabric with a high degree of insulation in order to protect young growing plants against freezing. Later in the season once the risk of frost has ended, it is advantageous to have a protective fabric which has a higher degree of air and water permeability as well as a higher degree of light transmission to assist in the growing process. In general, the goals of frost protection and growth enhancement by a protective fabric result in compromise between the need for insulation versus the need for air and water permeability and light transmission over the entire growing season.

SUMMARY OF THE INVENTION

Therefore, it is an object of the present invention to provide an agricultural protective fabric to be used as a crop cover which has dynamic characteristics allowing it to have a relatively high degree of insulation for frost and freeze protection during the early portion of the growing season and a relatively high degree of air and water permeability as well as light transmission ability during the latter part of the growing season to alleviate heat build up and thereby promote rapid growth.

It is likewise an object of the present invention to provide an agricultural protective fabric having such dynamic characteristics which is also light in weight, strong, resistant to penetration by many insects, and is easy to handle.

The foregoing objectives are achieved by an agricultural protective fabric comprising at least two layers. The first nonwoven layer consists of randomly oriented continuous thermoplastic filaments which are resistant to being degraded by the environment during the course of a growing season. The second nonwoven layer of the protective fabric comprises randomly oriented discontinuous discrete thermoplastic fibers which are degradable during the course of the growing season. The resulting protective fabric thereby provides a high degree of freeze and frost prevention during the early spring as a result of the two nonwoven layers, especially the highly insulative second layer comprised of discontinuous discrete thermoplastic fibers. As the weather gets warmer and the second layer degrades and disappears as a result of environmental action or as a result of treatment by the grower, the fabric provides increased light transmission and air and water permeability to promote plant growth and to prevent overheating.

Particularly, the protective fabric of the present invention comprises a first spun-bonded nonwoven layer of polypropylene filaments which have been treated with ultraviolet light stabilizers to make that layer resistant to ultraviolet degradation. The second nonwoven comprises melt-blown polypropylene fibers which have not been treated with ultraviolet stabilizers. The protective fabric is placed over the crops to be protected with the melt-blown layer on the outside and the spun-bonded layer next to the plants. The ultraviolet light from the sun's rays continuously degrades the melt-blown polypropylene fibers so that as the growing season progresses, and the need for insulation decreases, the insulative nature of the protective fabric decreases as the melt-blown fibers degrade and are lost to the environment.

Other objects and advantages of the invention will become apparent upon reading the following detailed description and upon reference to the drawings.

DETAILED DESCRIPTION OF THE INVENTION

While the invention will be described in connection with a preferred embodiment, it will be understood that I do not intend to limit the invention to that embodiment. On the contrary, I intend to cover all alternatives, modifications, and equivalents as may be included within the spirit and scope of the invention as defined by the appended claims.

Figure 1:
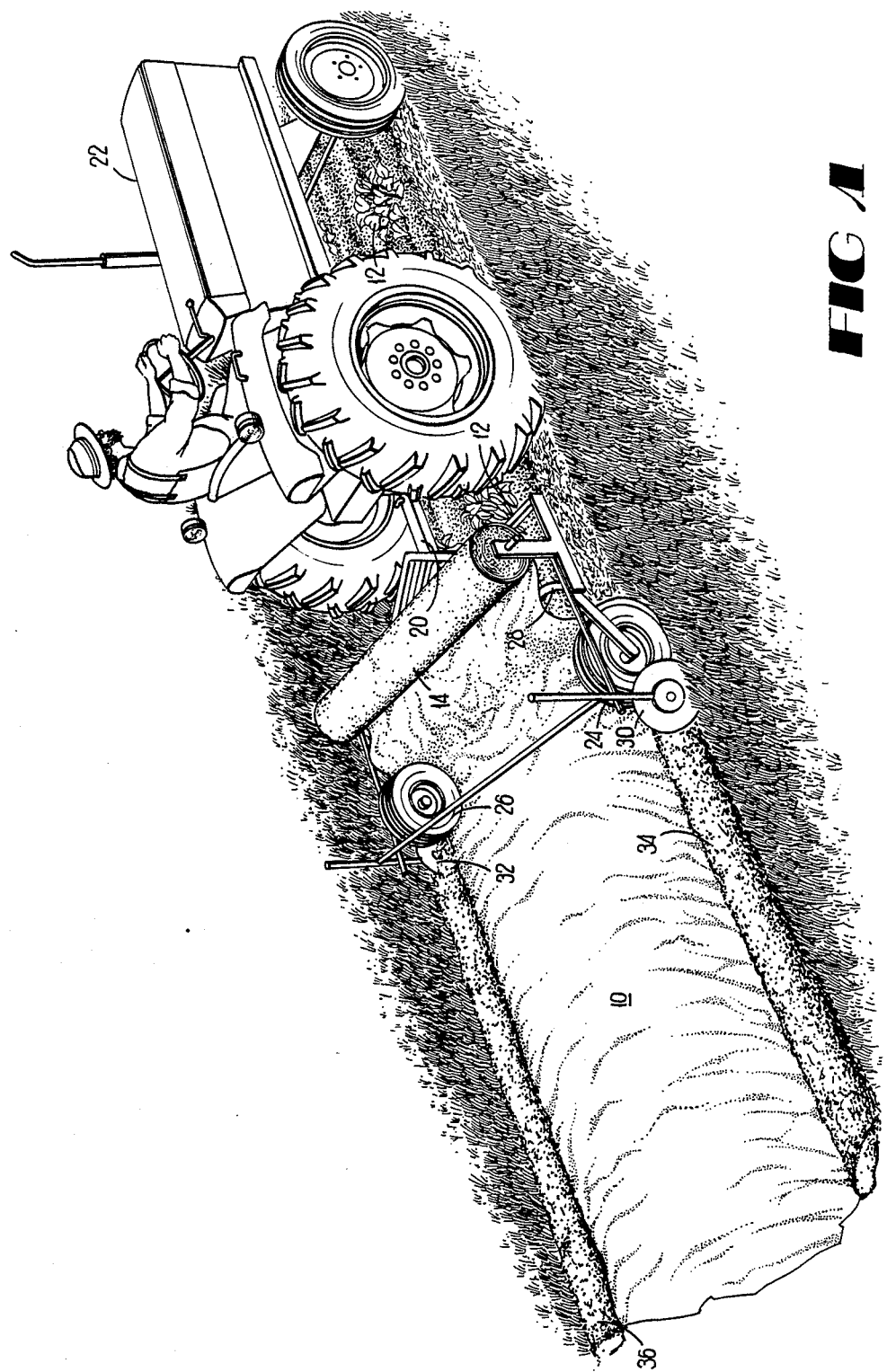
FIG. 1 is a prospective view showing the application of protective fabric of the present invention to growing plants.

Turning to FIG. 1 there is shown a protective fabric 10 embodying the present invention. The protective fabric 10 is used to cover growing plants 12 to protect them from frost, insects, and dessication. In addition, the protective fabric 10 allows for the transmission of light and permeation of air and water to create a greenhouse-like environment around the growing plants to stimulate their growth. The fabric 10 may be supplied to a grower in the form of a roll 14. The roll 14 of fabric is attached to an implement 16 specially designed for laying the fabric over the plants 12. Particularly, implement 16 is attached by means of a hitch 20 to a tractor 22 so that it may be pulled along on flotation wheels 24 and 26. The roll 14 is mounted for rotation on brackets 18. The fabric 10 passes over upward curved guidebar 28 and under each of the flotation wheels 24 and 26. The upwardly curved guidebar 28 provides slack between the sides of the fabric 10. The flotation wheels 24 and 26 lay and hold the edges of the fabric 10 on the ground. Colters 30 and 32 open a furrow and create a ridge of dirt 34 or 36 on each edge of the fabric 10 in order to hold the fabric in place at its edges.

Figure 2:
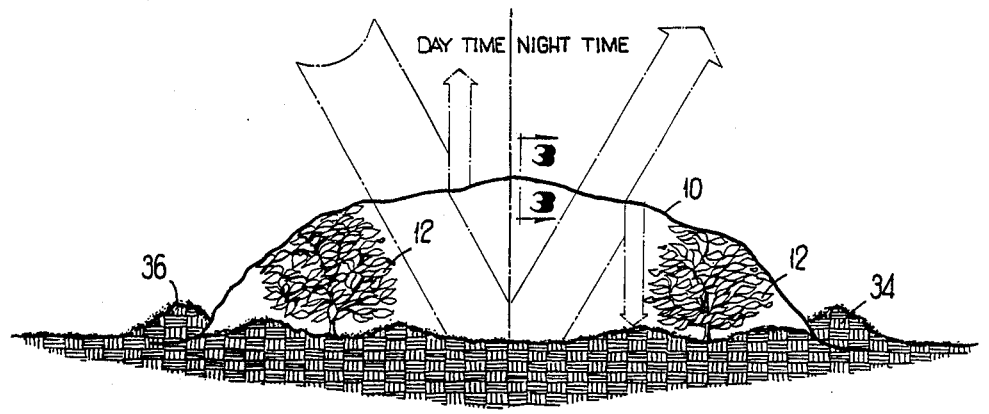
FIG. 2 is an elevation view in cross section schematically showing the daytime versus nighttime performance of the protective fabric of the present invention.

As can best be seen in FIG. 2, the fabric 10 is held in place at its edges by ridges 34 and 36 and enough slack is provided between the ridges 34 and 36 to form a canopy and provide room for the plants 12 to grow. The fabric 10 is lightweight enough so that it can be supported by the growing plants.

With continuing reference to FIG. 2, the fabric 10 covers the growing plants 12 to protect them from frost, insects, and dessication. In addition, the fabric 10 allows for the transmission of sunlight to the growing plants, for permeation of air and water, and for retention of heat to provide a greenhouse effect beneath the canopy formed by the fabric 10 to enhance the growth of the plants.

As previously noted, the fabric 10 is used to cover growing plants to protect them during the early spring from the possibility of frost. FIG. 2 shows how heat is collected under the fabric canopy during the daytime and then retained at night by the insulative nature of fabric 10. As a consequence, the growing plants can be protected from the effects of external frost down to several ambient degrees below freezing as a result of the residual heat retained beneath the insulative fabric 10. In accordance with the present invention, the fabric 10 has dynamic thermal insulation characteristics which during the early spring produce a relatively high degree of insulation and later in the season, when the risk of frost has diminished, provide less relative insulation and higher porosity so that excess heat does not build up under the fabric 10 during the warmer part of the growing season.

Figure 3:
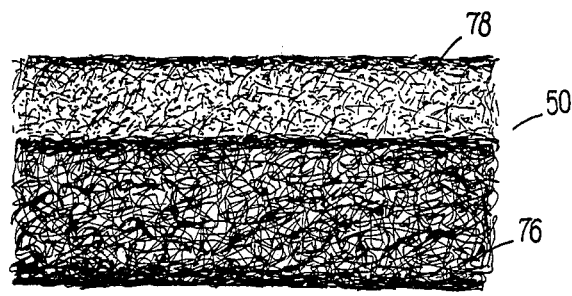
FIG. 3 is a cross sectional view of the fabric of the present invention showing the layers as seen along line 3—3 of FIG. 2.

The fabric 10 having such dynamic insulating characteristics consists of two layers 50 and 52 (FIG. 3). Particularly, the layer 52 consists of randomly oriented continuous thermal plastic filaments made by means of a spun-bond process. The layer 50 comprises randomly oriented discrete discontinuous thermal plastic fibers made by a melt-blowing process.

Figure 4:
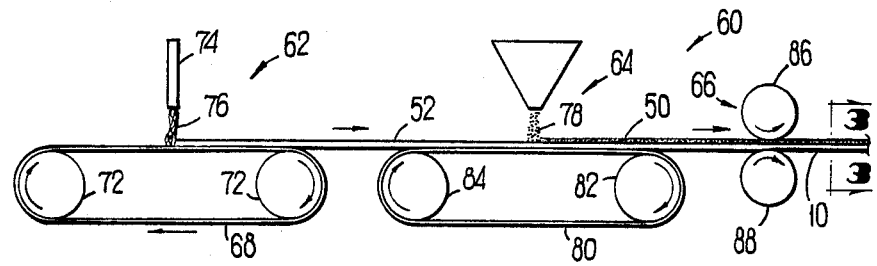
FIG. 4 is a schematic representation of the machinery and process for manufacturing the agricultural protective fabric of the present invention.

Turning to FIG. 4 there is shown schematically a process and machinery 60 for manufacturing the fabric in accordance with the present invention. The machinery 60 includes a spun-bonded station 62, followed serially by melt-blown station 64, and calendering station 66. The spun-bonded station 62 includes a continuous foraminous belt 68 mounted on rollers 70 and 72 for movement as indicated by the arrows. Spun-bonded head 74 is mounted above the foraminous belt 68 and produces nonwoven spun-bonded web 52 of substantially continuous and randomly deposited, molecularly oriented filaments 76 of thermoplastic polymer.

The nonwoven spun-bonded web 28 is prepared in conventional fashion such as illustrated by the following patents: Dorschner et al. U.S. Pat. No. 3,692,618; Kinney U.S. Pat. Nos. 3,338,992 and 3,341,394; Levy U.S. Pat. No. 3,276,944; Peterson U.S. Pat. No. 3,502,538; Hartmann U.S. Pat. Nos. 3,502,763 and 3,909,009; Dobo, et al. U.S. Pat. No. 3,542,615; and Harmon Canadian Pat. No. 803,714. Spun-bonded materials prepared with continuous filaments 76 generally have at least three common features. First, the polymer is continuously extruded through a spinneret to form discrete filaments. Thereafter, the filaments are drawn either mechanically or pneumatically without breaking in order to molecularly orient the polymer filaments and achieve tenacity. Lastly, the continuous filaments are deposited in a substantially random manner onto the carrier belt 68 to form the web 52.

Once the spun-bonded web 52 has been prepared, it may either be calendered and collected on a roll for future processing in accordance with the remainder of the process shown schematically in FIG. 4. Alternatively, as specifically shown in FIG. 4, the spun-bonded web 52 may be fed directly to the melt-blown station 64 where it forms the substrate for collecting the randomly oriented discrete discontinuous fibers of the melt-blown layer 50.

The melt-blown station 64 consists of a die 65 which is used to form microfibers 78 and a foraminous belt 80 mounted for movement on rollers 82 and 84 in the direction shown by the arrows. The spun-bonded web 52 is fed to the belt 80, and the microfibers 78 are randomly deposited on top of the spun-bonded layer 52 and form the melt-blown layer 50. The construction and operation of the melt-blwon station 64 for forming microfibers 78 and melt-blown layer 50 is considered conventional, and the design and operation are well within the skill of those of ordinary skill in the art. Such skill is demonstrated by NRL Report 4364, "Manufacture of Super-Fine Organic Fibers", by V. A. Wendt, E. L. Boon, and C. D. Fluharty; NRL Report 5265, "An Improved Device for the Formation of Super-Fine Thermoplastic Fibers", by K. D. Lawrence, R. T. Lukas, and J. A. Young; and, U.S. Pat. No. 3,849,241, issued Nov. 19, 1974, to Buntin, et al.

After the microfibers 78 have been deposited on the spun-bonded web 52 and have formed a melt-blown web 50 thereon, the two component web is fed to the calendering station 66. Calendering station 66 consists of bonding rolls 86 and 88 which have bonding patterns (protusions) engraved on their surfaces. The rolls 86 and 88 are heated and forced together so that the protusions engraved on the surfaces form spot bonds or pattern bonds between the two layers of the web. In practice, the bonded area (the area of the protusions on the rollers) should occupy between 5% and 25% of the total area of the web's surface. The bonding pattern or spot bonding is used to assure that the majority of the fabric 10 maintains its loft and therefore insulative capabilities resulting therefrom. The percentage of bonded areas is selected to assure adequate bonding between the layers so that delamination of the layers does not result during ordinary handling of the fabric 10 prior to the dynamic degradation of the layer 50 during the course of a single growing season.

In manufacturing the fabric 10 of the present invention, the spun-bonded and melt-blown layers may be made from any number of thermoplastic materials which can be spun into filaments in accordance with conventional spun-bonding techniques or which can be used to produce fibers in accordance with conventional melt-blowing techniques. Polymers that may be used in making the spun-bonded web 52 of the present invention include polypropylene, polyesters, nylon, polythylene, and any other polymer that can be spun into filaments for forming a web. Polypropylene, however, is generally preferred. With respect to the melt-blown layer, and depending on the nature of the dynamic degradation, the following polymers may be useful in manufacturing the melt-blown layer 50, polypropylene, polyester, nylon, polyethylene, and any other polymer that can be melt-blown into fibers for forming a web. Polypropylene, however, is preferred.

The resulting fabric 10 prior to dynamic degradation must possess several important characteristics. First, the fabric must be light in weight for ease in handling and so that it can be supported to form a canopy by the growing plants. In that regard, the basis weight of the fabric 10 should be between 0.2 ounce per square yard (oz-/yd$^2$) and 2.0 oz/yd$^2$. The fabric 10 should have sufficient tensile strength to resist tearing during handling and the effects of wind during use. The fabric 10 should possess tensile strengths in the range of 3.5 lbs through 25 lbs. The fabric should be drapable so that it is easy to handle. The drape stiffness should be between 1.0 cm, and 4.5 cm. The fabric must be capable of transmitting light to the growing plants beneath the fabric canopy. The fabric 10 must have a light transmission capability of at least 60% PAR. The fabric 10 should also be permeable to air and water to aid in the growth process. Consequently, during the early part of the growing season the fabric 10 should have a porosity of at most 600 ft$^3$/ft$^2$/min and generally in the range between 300 ft$^3$/ft$^2$/min and 600 ft$^3$/ft$^2$/min. During the later part of the growing season, the fabric 10 should have a porosity of at least 700 ft$^3$/ft$^2$/min and generally in the range between 700 ft$^3$/ft$^2$/min and 1100 ft$^3$/ft$^2$/min. Finally, during the early part of the growing season before the dynamic degradation of the fabric 10, the fabric 10 should possess a relatively high degree of insulation sufficient to protect the growing plants from ambient temperatures of at least 4° F. degrees below freezing and generally in the range between 4° F. and 10° F. below freezing.

The characteristics outlined above are determined in accordance with standardized test procedures. Grab tensile strength was tested using a Federal Test Method (FTM) 5100. Drape stiffness was determined in accordance with FTM 191A, Method 5206. Light transmission was tested by determining the percentage of light in the 400 to 700 nanometer wave length range passing through the fabric. The light transmission measurement is carried out by using a Li-Cor light meter (Li-Cor, Inc., Lincoln, Neb.) which measures a weighted average of the light within the range of 400 to 700 nanometers. Porosity was tested using FTM 191A, Method 5450. Insulation was determined by means of tests in a growth chamber in which the ambient temperature was reduced to the point that the temperature under the cover reached freezing. Particularly the initial ambient temperature was set at 10° C., and the chamber wwas stabilized at that point. The ambient temperature was then dropped at the rate of 1° C. per hour to −5° C. At the point the ambient temperature reached −5° C., the temperature under the cover was measured, and the difference between the ambient and under the cover was recorded.

In order to achieve the advantage of the present invention, the melt-blown layer 50 must be degradable during the course of a growing season so that in the early spring the fabric 10 prior to degradation can provide a relatively high degree of insulation and later in the growing season with the degradation of the layer 50, the remaining spun-bonded layer 52 can provide a relatively high degree of light transmission and permeability. Dynamic degradation of the insulative melt-blown layer 50 can be accomplished in a number of ways. In one embodiment of the invention, the spunbond layer 52 is polypropylene and is treated with an ultraviolet light stabilizer. The melt-blown layer 50 is also polypropylene but is not treated with an ultraviolet light stabilizer. The ultraviolet light from the sun causes the layer 50 to degrade and disappear into the environment during the course of the growing season.

Another mechanism for achieving dynamic degradation of the melt-blown layer is accomplished by a melt-blown layer 50 having fibers that degrade by exposure to the environmental heat produced by the sun later in the growing season as compared to the heat of the sun experienced during the early part of the growing season. Another mechanism for dynamic degradation of the melt-blown layer 50 results from having fibers that are degradable by exposure to environmental oxidation of the fibers. In some applications it may be desirable for the grower to exercise some degree of control over the timing of the degradation of the layer 50, as opposed to rleying on the environmental action of ultraviolet light, heat, or oxidation. In that regard, it may be advantageous to have a melt-blown layer 50 which degrades as a consequence of being exposed to chemical treatment. The layer 50 is not degradable as a result of its exposure to its environment until such time as the grower treats the layer, such as by spraying the layer with a chemical either serves as a catalyst to enhance the effects of environmental degradation or which itself directly degrades the melt-blown layer 50.

The present invention is illustrated by the following agriculture protective fabrics.

EXAMPLE 1

A fabric that will dynamically degrade as a result of exposure to environmental ultraviolet light was made as follows:

Spun-bonded—First Layer
  Polymer—Himont PC 973 Polypropylene (Hercules, Inc., Oakbrook, Il)
  Additives—Allied 8860KC U.V. Stabilizer (Allied Ind., Morristown, NJ)
  Ampacet 41438 White Pigment (Ampacet Corp., Mount Vernon, NY)
  Ampacet 46386 Blue Pigment (Ampacet Corp., Mount Vernon, NY)
  Composition
    #1 White
      PC 973—98.5%
      Allied 8860KC—1.0%

Ampacet 41438—0.5%
2 Blue
  PC 973—98.0%
  Allied 8860KC—1.0%
  Ampacet 46386—1.0%
Process Conditions—Standard configuration for spun-bonded manufacture (made in accordance with the disclosure of Dorschner et al. U.S. Pat. No. 3,692,618)
Basis Weight—0.4 oz/yd$^2$ ($\pm$0.05)
Formation—3+(a subjective test compring material produced to existing material already graded. This grade implies there are no gross light or heavy areas, streaks, etc.)
Tensile Strength—Greater than 6 lbs.
Melt-blown—Second Layer
  Polymer—Exxon 3214 polypropylene (Exxon Corp., Des Plaines, Il)
  Additives—Fina Q858 polypropylene/peroxide master batch (Fina Oil & Chemical Co., Dallas, TX)
  Composition—Exxon 3214—96%, Peroxide—4%
  Process Conditions
    Forming distance—13 in
    Throughput—1.3 PIH (lbs/in of die width/hr)
    Air temp.—563° F.
    Melt temp.—523° F.
    Air flow—250 standard cubic feet per minute
    1 bank, recess die tip configuration (see Lau U.S. Pat. No. 4,526,733)
  Fiber Size—10 um (micron) average (1 to 20 um)
Lamination
  Bonding pattern—5% to 25% of surface area bonded
  Temperature—243° F.
  Pressure—900 psi
Laminate Fabric Specifications
  Basis weight—0.6 oz/yd$^2$
  Grab tensile
    5.1 lbs MD
    5.5 lbs CD
  Frasier Porosity
    initial—428 ft$^3$/ft$^2$/min
    5 week—989 ft$^3$/ft$^2$/min
  Drape Stiffness
    2.4 cm MD
    1.7 cm CD
  Light Transmission PAR
    initial—82% white SB
    5 week—88% white SB
    initial—73% blue SB
    5 week—86% blue SB
  Thermal Protection—5.5° F.

I claim:

1. A protective fabric covering growing plants comprising:
   a. a first nonwoven web layer comprising a first material that is resistant to environmental degradation during the course of a growing season; and
   b. a second nonwoven web layer laminated to the first layer and comprising a second material that is degradable during the course of the growing season.

2. The protective fabric of claim 1, wherein the fabric initially is air and water permeable, transmits light, is light weight, is strong, and is heat insulative and during the course of the growing season as a result of degradation of the second layer the fabric becomes more air and water permeable, transmits more light, becomes lighter in weight, and becomes less insulative.

3. The protective fabric of claim 2, wherein the first layer comprises randomly oriented continuous thermoplastic filaments and the second layer comprises randomly oriented discrete discontinuous thermoplastic fibers.

4. The protective fabric of claim 3, wherein the fibers of the second layer are degradable by exposure to environmental ultraviolet light.

5. The protective fabric of claim 4, wherein the first material is a thermoplastic material and is selected from the group consisting of polypropylene, polyester, nylon, and polyethylene which has been treated to be resistant to environmental degradation and the second material is a thermoplastic material and is selected from the group consisting of polypropylene, polyester, and polyethylene, which is untreated and is degradable by exposure to environmental ultraviolet light.

6. The protective fabric of claim 5, wherein the fabric before degradation of the second layer has a basis weight between 0.2 oz/yd$^2$ and 2.0 oz/yd$^2$, tensile strength between 3.5 lb and 25 lb, light transmission of at least 60% PAR, porosity between 300 ft$^3$/ft$^2$/min and 600 ft$^3$/ft$^2$/min, and insulative protection between 5° F. and 10° F. below freezing, and wherein after degradation the fabric has a porosity between 700 ft$^3$/ft$^2$/min and 1100 ft$^3$/ft$^2$/min.

7. The protective fabric of claim 3, wherein the fibers of the second layer are degradable by exposure to environmental heat.

8. The protective fabric of claim 3, wherein the fibers of the second layer are degradable by exposure to environmental oxidation.

9. The protective fabric of claim 3, wherein the fibers of the second layer are degradable by exposure to in situ chemical treatment.

* * * * *